United States Patent
Ja et al.

(10) Patent No.: US 7,453,759 B2
(45) Date of Patent: Nov. 18, 2008

(54) CLOCK-GATED MODEL TRANSFORMATION FOR ASYNCHRONOUS TESTING OF LOGIC TARGETED FOR FREE-RUNNING, DATA-GATED LOGIC

(75) Inventors: Yee Ja, Round Rock, TX (US); Bradley S. Nelson, Austin, TX (US); Wolfgang Roesner, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 185 days.

(21) Appl. No.: 11/380,257

(22) Filed: Apr. 26, 2006

(65) Prior Publication Data
US 2007/0253275 A1    Nov. 1, 2007

(51) Int. Cl.
*G11C 8/00* (2006.01)
(52) U.S. Cl. .............. 365/230.05; 365/189.04; 365/191; 365/230.05
(58) Field of Classification Search ............. 365/230.05, 365/189.04, 191, 230.03
See application file for complete search history.

(56) References Cited
U.S. PATENT DOCUMENTS

| | | |
|---|---|---|
| 4,857,868 A | 8/1989 | Robb |
| 4,870,345 A | 9/1989 | Tomioka et al. |
| 5,650,938 A | 7/1997 | Bootehsaz et al. |
| 5,956,748 A * | 9/1999 | New ........................... 711/149 |
| 5,960,052 A | 9/1999 | Bombal et al. |
| 6,009,256 A | 12/1999 | Tseng et al. |
| 6,078,528 A * | 6/2000 | Johnson et al. ........ 365/189.05 |
| 6,353,906 B1 | 3/2002 | Smith et al. |
| 6,467,044 B1 | 10/2002 | Lackey |
| 6,535,946 B1 | 3/2003 | Bryant et al. |
| 6,760,277 B1 | 7/2004 | Farooq |
| 6,785,855 B2 * | 8/2004 | Zhang et al. ................ 714/731 |
| 6,799,280 B1 | 9/2004 | Edenfield et al. |

* cited by examiner

*Primary Examiner*—Pho M. Luu
(74) *Attorney, Agent, or Firm*—Casimer K. Salys; Jack V. Musgrove

(57) ABSTRACT

Asynchronous behavior of a circuit is modeled by modifying latches in a netlist to add an extra port to the latches, e.g., a single-port latch is transformed into a dual-port latch. Each input port has an enable line and a data input. The data input in the added port is a feedback line from the latch output, and the enable line in the added port is the logical NOR of all of the original enable lines. By adding this extra latch port in the higher-level model, it becomes possible to introduce assertion logic to ensure that one and only one latch port for a given latch is ever active during the same simulation cycle. The model can then be tested earlier in the design methodology prior to the availability of the post-synthesis netlist. The model can also be used in both simulation and formal or semi-formal verification.

5 Claims, 4 Drawing Sheets

CLOCK-GATED MODEL TRANSFORMATION FOR ASYNCHRONOUS TESTING OF LOGIC TARGETED FOR FREE-RUNNING, DATA-GATED LOGIC

BACKGROUND OF THE INVENTION

1. Field of the Invention

The present invention generally relates to the fabrication and design of semiconductor chips and integrated circuits, specifically to a method of modeling the operation of a circuit running under asynchronous conditions, and more particularly to a model transformation for clock-gated logic that may be implemented as free-running, data-gated logic.

2. Description of the Related Art

Integrated circuits are used for a wide variety of electronic applications, from simple devices such as wristwatches, to the most complex computer systems. A microelectronic integrated circuit (IC) chip can generally be thought of as a collection of logic cells with electrical interconnections between the cells, formed on a semiconductor substrate (e.g., silicon). An IC may include a very large number of cells and require complicated connections between the cells. A cell is a group of one or more circuit elements such as transistors, capacitors, resistors, inductors, and other basic circuit elements grouped to perform a logic function. Cell types include, for example, core cells, scan cells and input/output (I/O) cells. Each of the cells of an IC may have one or more pins, each of which in turn may be connected to one or more other pins of the IC by wires. The wires connecting the pins of the IC are also formed on the surface of the chip. For more complex designs, there are typically at least four distinct layers of conducting media available for routing, such as a polysilicon layer and three metal layers (metal-1, metal-2, and metal-3). The polysilicon layer, metal-1, metal-2, and metal-3 are all used for vertical and/or horizontal routing.

An IC chip is fabricated by first conceiving the logical circuit description, and then converting that logical description into a physical description, or geometric layout. This process is usually carried out using a "netlist," which is a record of all of the nets, or interconnections, between the cell pins. A layout typically consists of a set of planar geometric shapes in several layers. The layout is then checked to ensure that it meets all of the design requirements, particularly timing requirements. The result is a set of design files known as an intermediate form that describes the layout. The design files are then converted into pattern generator files that are used to produce patterns called masks by an optical or electron beam pattern generator. During fabrication, these masks are used to pattern a silicon wafer using a sequence of photolithographic steps. The process of converting the specifications of an electrical circuit into a layout is called the physical design.

Cell placement in semiconductor fabrication involves a determination of where particular cells should optimally (or near-optimally) be located on the surface of a integrated circuit device. Due to the large number of components and the details required by the fabrication process for very large scale integrated (VLSI) devices, physical design is not practical without the aid of computers. As a result, most phases of physical design extensively use computer-aided design (CAD) tools, and many phases have already been partially or fully automated. Automation of the physical design process has increased the level of integration, reduced turn around time and enhanced chip performance. Several different programming languages have been created for electronic design automation (EDA), including Verilog, VHDL and TDML. A typical EDA system receives one or more high level behavioral descriptions of an IC device, and translates this high level design language description into netlists of various levels of abstraction.

Faster performance and predictability of responses are elements of interest in circuit designs. As process technology scales to the deep-submicron (DSM) regime, clock-related problems such as clock skew and worst-case execution time are becoming increasingly important to the performance and reliability of IC chips and systems. With synchronous logic, static timing is performed to ensure that when a latch transitions, the correct value will meet the timing requirements of any downstream latch. One clock cycle is enough time for the transitioning value to be seen on the latch input without violating the setup requirements for that latch. Unfortunately, when a gating term in the clock logic is driven from an asynchronous source relative to a receiving latch, it becomes much more difficult to accurately test a circuit because the receive latch may be clocked at any time after the send latch transitions. The transitioning data may not have had enough time to reach the input of the receive latch, and if the new value of the send latch fails to reach the receive latch prior to its sampling of the input, the prior value will the latched. If the transition occurs within the setup and hold times required by the receive latch, the latch may become metastable. For a receive clock period, an old (pre-transition) value or new (post-transition) value may be latched, or the latch may become metastable.

It is commonplace for logic to be tested using a higher-level model than that which will be synthesized, e.g., the higher-level model may be a behavioral netlist and the post-synthesis model may be a gate-level netlist. In particular, logic written using a clock-gated implementation for sequential elements may sometimes be synthesized using a free-running, data-gated implementation. One example of such an implementation is illustrated in FIGS. 1A and 1B. FIG. 1A shows a typical netlist abstraction for a latch 2 having an enable line and a data input. The enable line is the output of an AND gate 4 whose inputs are the clock signal and a gating or control signal. This circuit construction is verified by the EDA tools, but the actual (physical) implementation is often different as depicted in FIG. 1B. The actual latch 2' receives the clock signal directly at the enable line, while the data input is connected to a multiplexer 6 whose select line is connected to the control signal. The other input of multiplexer 6 is a feedback line from the output of latch 2'. The differences in the implementations arise from difficulties in breaking out the gating logic from the clock network. A problem which exists in this methodology is that certain asynchronous problems are undetectable in the behavioral model which may be apparent in the gate-level model. The testing performed on the high level model is thus inadequate for the netlist which will be synthesized.

There are many ways that a high-level behavioral model may be different from a gate-level model. There are also many ways in which latch ports may be modeled in both forms of netlist. However, when a behavioral model netlist is using a form for a clock-gated implementation and the post-synthesis netlist is using a free-running, data-gated implementation for their respective sequential elements, the post-synthesis netlist will always have a potential source of asynchronous problems. It would, therefore, be desirable to devise an improved method of modeling logic which could take into consideration possible differences between a higher-level model and a post-synthesis model. It would be further advantageous if the method could allow for earlier detection of asynchronous problems in gate-level models.

SUMMARY OF THE INVENTION

It is therefore one object of the present invention to provide an improved method of modeling asynchronous behavior of a circuit.

It is another object of the present invention to provide such a method which may detect asynchronous problems in a circuit which was designed for a clock-gated implementation but is carried out using a free-running, data-gated implementation.

It is yet another object of the present invention to provide such a method which can be used in both simulation and formal or semi-formal verification.

The foregoing objects are achieved in a method of modeling asynchronous behavior of a circuit, by identifying a first latch in a netlist for the circuit, the latch having at least one input port, and each input port having a corresponding original enable line and a corresponding original data input, and then modifying the netlist to substitute for the first latch a respective second latch having an additional input port with an additional enable line and an additional data input. For example, the first latch may be a single-port latch, and the modification substitutes a dual-port latch for the single-port latch. The additional data input for a given second latch is a feedback line from the output of the given second latch. The additional enable line for a given second latch is the logical NOR of all of the original enable lines of the first latch such that, for the given second latch, no more than one of the original enable lines and the additional enable line is active.

The above as well as additional objectives, features, and advantages of the present invention will become apparent in the following detailed written description.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

The present invention provides a novel method for modeling asynchronous behavior of a circuit, and is generally applicable to any type of digital circuit, such as execution units or memory, and clock-controlled (functional) or free-running (scan) logic. The method takes a netlist generated by conventional means and modifies latches in the netlist by adding an extra latch port to better emulate asynchronous conditions and identify potential timing problems. As explained more fully below, the present invention is particularly useful in modeling asynchronous behavior of a circuit which is clock-gated at a high-level abstraction but may be implemented as free-running, data-gated logic.

Figure 1A:
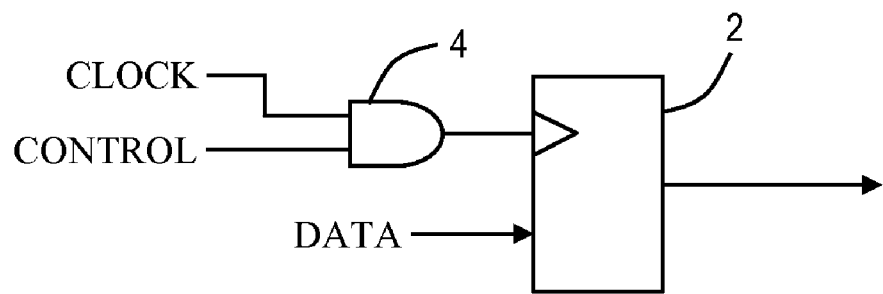
FIG. 1A is a schematic diagram of a netlist abstraction for a latch circuit whose output drives downstream logic.
Figure 1B:
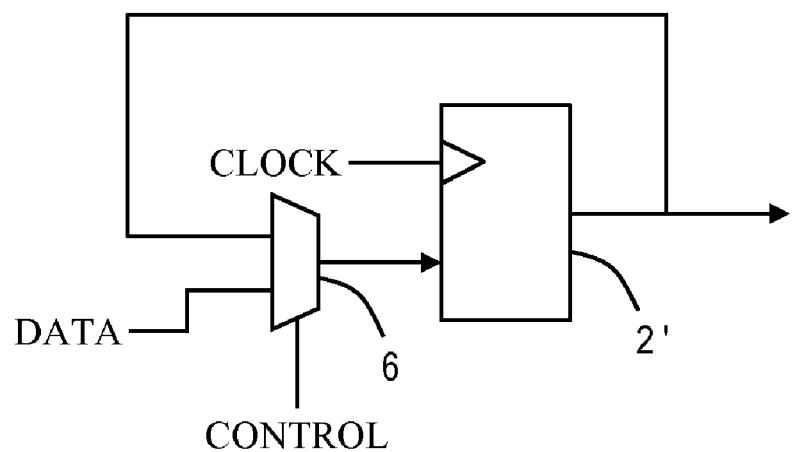
FIG. 1B is a schematic diagram of a free-running, data-gated implementation for the latch circuit of FIG. 1A.
Figure 2:
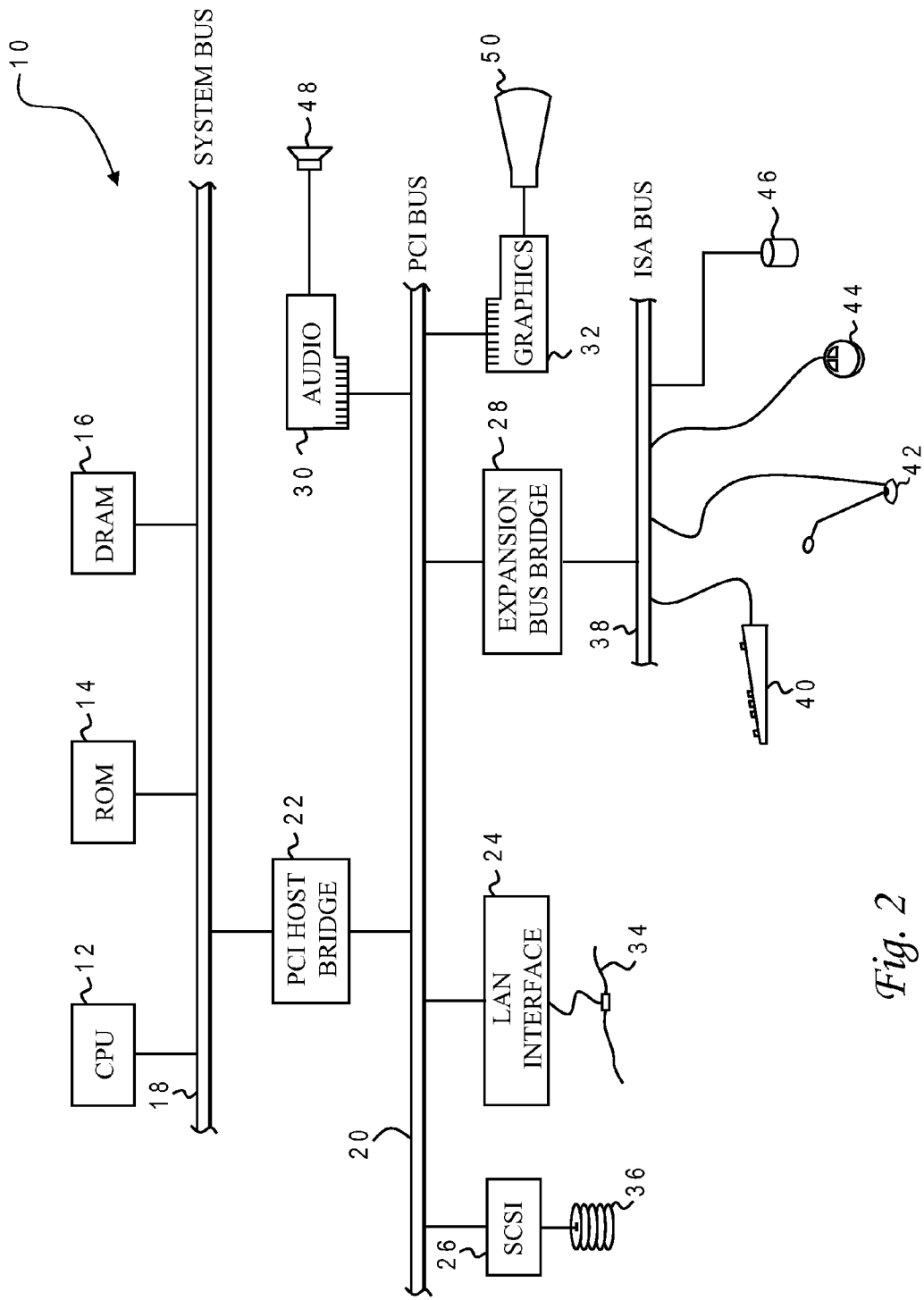
FIG. 2 is a block diagram of one embodiment of a computer system programmed to carry out modeling of asynchronous behavior of a circuit in accordance with the present invention.

With reference now to the figures, and in particular with reference to FIG. 2, there is depicted one embodiment 10 of a computer system programmed to carry out the model transformation in accordance with one implementation of the present invention. System 10 includes a central processing unit (CPU) 12 which carries out program instructions, firmware or read-only memory (ROM) 14 which stores the system's basic input/output logic, and a dynamic random access memory (DRAM) 16 which temporarily stores program instructions and operand data used by CPU 12. CPU 12, ROM 14 and DRAM 16 are all connected to a system bus 18. There may be additional structures in the memory hierarchy which are not depicted, such as on-board (L1) and second-level (L2) caches. In high performance implementations, system 10 may include multiple CPUs and a distributed system memory.

CPU 12, ROM 14 and DRAM 16 are coupled to a peripheral component interconnect (PCI) local bus 20 using a PCI host bridge 22. PCI host bridge 22 provides a low latency path through which processor 12 may access PCI devices mapped anywhere within bus memory or I/O address spaces. PCI host bridge 22 also provides a high bandwidth path to allow the PCI devices to access DRAM 16. Attached to PCI local bus 20 are a local area network (LAN) adapter 24, a small computer system interface (SCSI) adapter 26, an expansion bus bridge 28, an audio adapter 30, and a graphics adapter 32. LAN adapter 24 may be used to connect computer system 10 to an external computer network 34, such as the Internet. A small computer system interface (SCSI) adapter 26 is used to control high-speed SCSI disk drive 36. Disk drive 36 stores the program instructions and data in a more permanent state, including the program which embodies the present invention as explained further below. Expansion bus bridge 28 is used to couple an industry standard architecture (ISA) expansion bus 38 to PCI local bus 20. As shown, several user input devices are connected to ISA bus 38, including a keyboard 40, a microphone 42, and a graphical pointing device (mouse) 44. Other devices may also be attached to ISA bus 38, such as a CD-ROM drive 46. Audio adapter 30 controls audio output to a speaker 48, and graphics adapter 32 controls visual output to a display monitor 50, to allow the user to carry out the asynchronous modeling as taught herein.

While the illustrative implementation provides the program instructions embodying the present invention on disk drive 36, those skilled in the art will appreciate that the invention can be embodied in a program product utilizing other computer-readable media, including transmission media. The program instructions may be written in the C++ programming language for an AIX environment. System 10 may have additional programs that include conventional circuit design tools, e.g., to generate an original netlist, and to analyze the modified netlist that is created by the present invention.

Figure 3A:
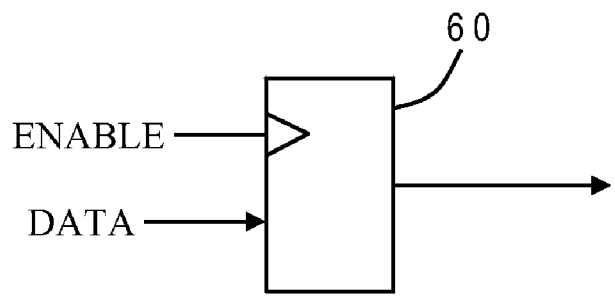
FIG. 3A is a schematic diagram of one example of an array of latches forming part of a netlist which is to be modeled, wherein the latches are all single-port.
Figure 3B:
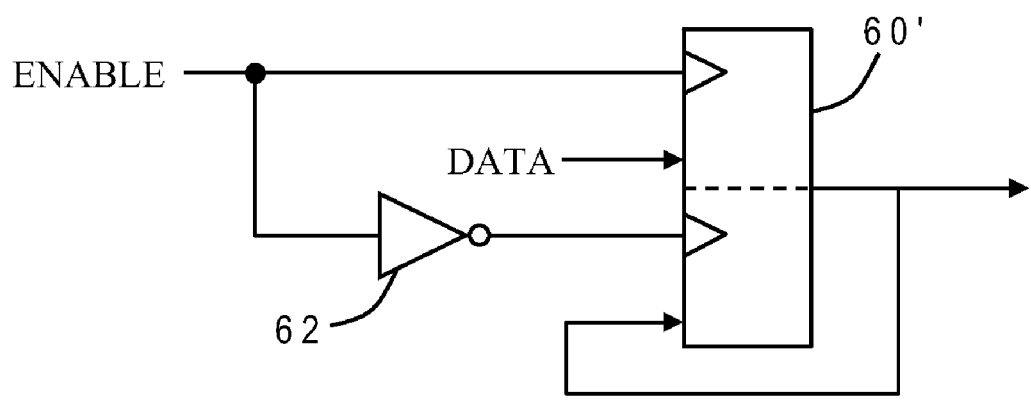
FIG. 3B is a schematic diagram of a model transformation for the latch array of FIG. 3A in accordance with one implementation of the present invention.

Computer system 10 carries out program instructions for a modeling process in which one or more latches are transformed by adding an extra latch port whose data input is the output of the given latch and whose enable line is the NOR of all enable lines in the original latch. The process begins by identifying the latch ports in the high-level model or netlist. The original netlist may be generated using a conventional tool such as a VHDL or Verilog language compiler. Logic is then added to form the data feedback paths and generate the new enable lines for each added port. One example of this model transformation is shown in FIGS. 3A and 3B. The original netlist shown in FIG. 3A includes a single-port latches 60. Latch 60 has an enable line and data input, and has a single output which is latched from the data input whenever the enable signal is turned on. The gating logic controlling the enable signal may be far removed from the latch in the clock tree. In FIG. 3B, this latch has been transformed into a dual-port latch 60'. Latch 60' still has the original port with its corresponding enable line and data input. The second port for latch 60' includes a feedback line from the respective latch output, and an enable line (~ENABLE) which is the output of an inverter 62. The output of latch 60A' is the logical OR of its two data inputs.

By adding this extra latch port in the higher-level model, it becomes possible to introduce asserts in the model. The assertion will ensure that no more than a single latch port for a given latch is ever active during the same simulation cycle. The model can then be tested earlier in the design methodology without waiting for a post-synthesis netlist. The model can also be used in both simulation and formal or semi-formal verification.

The model transformation of the present invention may generally be used with any latch type, have a set of clock pins and bundled data sets. Each clock pin may enable a different set of data pins to contribute to the output value. It is also not necessary for each clock to affect all output signals. This scenario is obtained by connecting less than all of the input pins corresponding to a clock since disconnected pins have no effect on the corresponding output.

Figure 4A:
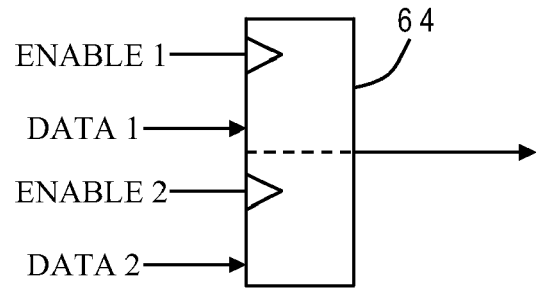
FIG. 4A is a schematic diagram of another example of an array of latches forming part of a netlist which is to be modeled, wherein the latches are all dual-port.
Figure 4B:
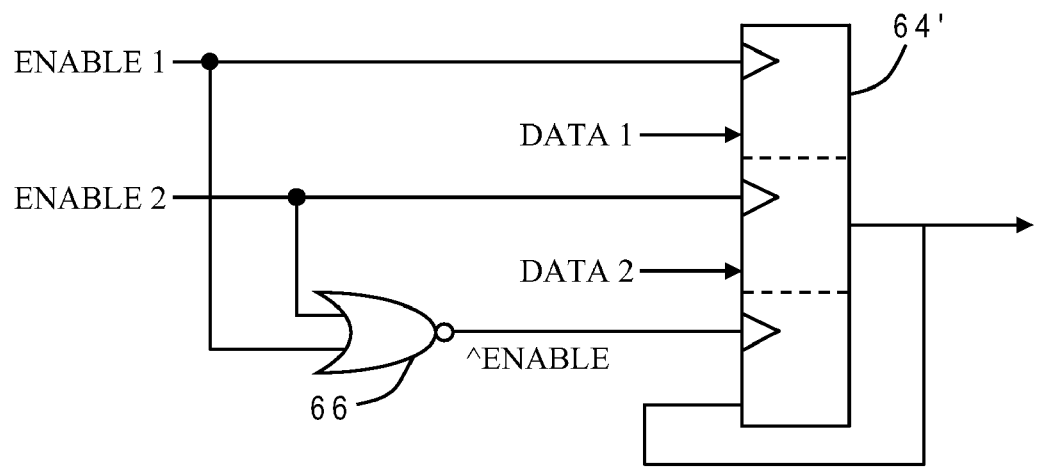
FIG. 4B is a schematic diagram of a model transformation for the latch array of FIG. 4A in accordance with another implementation of the present invention.

The asynchronous problems which may be undetectable in the behavioral model result when a latch enable is sourced by a net from a different clock domain. Because the post-synthesis netlist will use a free-running, data-gated clock implementation, the asynchronous connection will be replicated for this latch. If the latch is a single port latch in the behavioral model, it may appear as two-port latch in the gate level model. A different example is illustrated in FIGS. 4A and 4B. FIG. 4A shows another latch 64 from an original netlist having two separate ports (separate data inputs and enable lines). This two-port latch is transformed into a three-port latches 64' in FIG. 4B. The added port for latch 64' again has a data input which is the output of the respective latch, and an enable line which is the output of NOR gate 66, whose inputs receive all of the original enable lines. The output of latch 64' is the logical OR of its three data inputs.

Latch arrays with more than one latch may be modeled according to the present invention. The latches in an array do not need to be the same type, e.g., single-port and dual-port latches could be modeled in the same net. In the transform the latch port addition does not change the model into a free-running, data-gated model, since the latch ports are still clock-gated. The free-running data-gated latch model will result in different producible/detectable asynchronous behavior, i.e., port activity will still differ between the high-level model and that of the gate-level model. However, this transformation allows the detection of previously undetectable asynchronous logic problems when coupled with asynchronous skewing/jitter/delay logic to take advantage of this clock-gated latch modification. One example of such skew logic is described in copending U.S. patent application Ser. No. 11/360,906 entitled "MODELING ASYNCHRONOUS BEHAVIOR FROM PRIMARY INPUTS AND LATCHES", filed Feb. 23, 2006, which is hereby incorporated.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A method of modeling asynchronous behavior of a circuit, comprising:
   identifying a first latch in a netlist for the circuit wherein the first latch has at least one original input port, the original input port having a corresponding original enable line and a corresponding original data input; and
   modifying the netlist to substitute a second latch for the first latch wherein the second latch has the original input port and an additional input port with an additional enable line and an additional data input, wherein the additional data input for the second latch is a feedback line from the output of the second latch.

2. The method of claim 1 wherein the first latch is a single-port latch, and said modifying substitutes a dual-port latch for the single-port latch.

3. The method of claim 1 wherein the first latch is a dual-port latch, and said modifying substitutes a 3-port latch for the dual-port latch.

4. The method of claim 1 wherein the additional enable line for the second latch is the logical NOR of all of the original enable lines of the first latch such that, for the second latch, one and only one of the original enable lines and the additional enable line is active.

5. The method of claim 1 wherein the output of the second latch is the logical OR of all of its data inputs.

* * * * *